US005500656A

United States Patent [19]

Behrens et al.

[11] Patent Number: 5,500,656

[45] Date of Patent: Mar. 19, 1996

[54] DEVICE FOR CLAMPING AND RELEASING FILM MATERIAL AND OPERATION OF SAID DEVICE

[75] Inventors: Gunnar Behrens, Kiel; Gerhard Blöhdorn, Schönkirchen; Hans Penza, Preetz, all of Germany

[73] Assignee: Linotype-Hell AG, Eschborn, Germany

[21] Appl. No.: 30,374

[22] PCT Filed: Jun. 13, 1992

[86] PCT No.: PCT/DE92/00491

§ 371 Date: Mar. 18, 1993

§ 102(e) Date: Mar. 18, 1993

[87] PCT Pub. No.: WO93/01936

PCT Pub. Date: Feb. 4, 1993

[30] Foreign Application Priority Data

Jul. 19, 1991 [DE] Germany .......................... 41 24 004.9

[51] Int. Cl.[6] .............................. H04N 1/08; H04N 1/06; B41B 19/00

[52] U.S. Cl. .......................................... 346/136; 400/613

[58] Field of Search ................................ 355/72, 73, 75, 355/76, 308; 346/136, 108, 160; 271/264, 271, 171; 400/613

[56] References Cited

U.S. PATENT DOCUMENTS

| | | | |
|---|---|---|---|
| 3,689,150 | 9/1972 | Nothmann et al. | 355/73 |
| 3,730,623 | 5/1973 | Jordan | 355/73 |
| 4,595,957 | 6/1986 | Holthusen | 358/290 |
| 4,684,228 | 8/1987 | Holthusen | 354/4 |

FOREIGN PATENT DOCUMENTS

| | | |
|---|---|---|
| 0095936 | 7/1983 | European Pat. Off. . |
| 0126469 | 11/1984 | European Pat. Off. . |
| 0217136 | 4/1987 | European Pat. Off. . |
| 0086932 | 8/1983 | United Kingdom . |

*Primary Examiner*—Benjamin R. Fuller
*Assistant Examiner*—Raquel Yvette Gordan
*Attorney, Agent, or Firm*—Hill, Steadman & Simpson

[57] ABSTRACT

In order to improve a device for clamping and unclamping film material (3) on and from a stationary holder (12) in which the film material is taken by a transport device (4 to 8) through the holder (12) especially from an inlet to an outlet slot, and held in the holder (12) during exposure, in such a way that the film material can be reliably positioned in the holder (12), it is proposed that a positioning unit (19) be fitted which confers upon the film material (3) a tendency to move against the direction of transport when it is clamped.

10 Claims, 1 Drawing Sheet

DEVICE FOR CLAMPING AND RELEASING FILM MATERIAL AND OPERATION OF SAID DEVICE

BACKGROUND OF THE INVENTION

1. Field of the Invention

The invention refers to the field of electronic reproduction technology and is directed to a device and to the operation thereof for clamping film material into an exposure trough of a reproduction apparatus operating according to the internal drum principle and for releasing the exposed film material from the exposure trough.

2. Description of the Related Art

In such an internal drum reproduction device, also referred to as an internal drum recorder or exposer, the film material is fixed at the inside surface of a stationary mount that is shaped like a half-shell or, respectively, like a cylindrical segment and that is also referred to as an exposure trough. A light beam that is modulated in brightness by an image signal is generated in a recording element, this light beam being deflected in the direction onto the exposure trough by a rotating deflection system and being guided point-by-point and line-by-line across the film material for recording information while the recording element moves in the direction of a longitudinal axis of the exposure trough. The exposed film material is then removed from the exposure trough and is further-processed.

EP-B-0 126 469 already discloses an internal drum reproduction apparatus having a device for clamping and releasing film material. In the known device, the film material is guided through the exposure trough along a conveying slot shaped like a segment of a regular cylinder whose size is somewhat greater than that of the film material to be conveyed in order to suppress excess friction, jamming problems or the like. However, problems can thereby possibly arise to the effect that the position of the film material in the exposure trough can vary slightly, namely it can lie closer to the inside or outside wall and, potentially, can also produce folds to a certain extent, this deteriorating the exposure quality. Further, the known device also does not allow a fully automatic threading of the film material into the conveying path since, given utilization of a supply cassette, the film material must first be introduced between the conveyor rollers at the apparatus side before the automatic film conveying can occur. Moreover, the film material can vary in its lateral conveying length, so that the film material can emerge in different positions at the film discharge gap.

It is an object of the invention to create a device and the operation thereof for clamping and releasing film material that allows a reliable positioning of the film material in the exposure trough.

With the present invention, a device is provided for clamping and releasing film material onto and from a stationary holder. The film material is conveyed through the holder from a film entry to a film outlet slot with a conveyor means and is also fixed on the holder during an exposure. A positioning unit provides to the film material a motion tendency which is opposite a conveying direction during clamping.

BRIEF DESCRIPTION OF THE DRAWINGS

The drawing figure shows a device of the invention in cross-sectional view.

DESCRIPTION OF THE PREFERRED EMBODIMENTS

Figure 1:
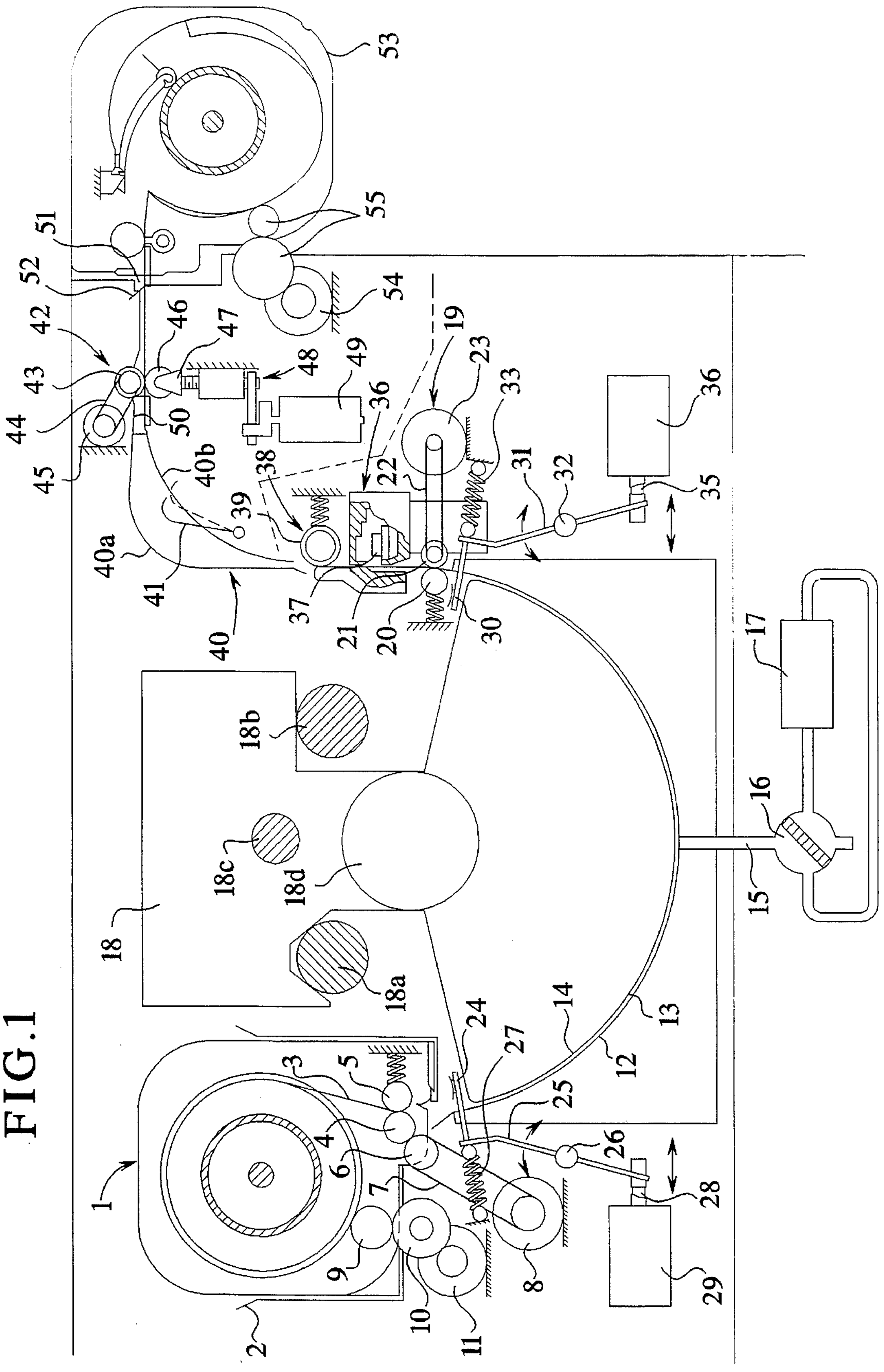

As a sectional view, the figure shows the fundamental structure of a device for the automatic clamping and releasing of film material on, or respectively from, the exposure trough of an electronic recording device operating according to the internal drum principle.

The film material to be clamped is deposited in a supply cassette 1 as roll film material, this supply cassette 1 being introduced into a mount 2 of the recording apparatus. The film material to be clamped—referred to below as film web 3—is conveyed via a pair of rollers 4, 5 arranged in the supply cassette 1 that are arranged at the film outlet of the supply cassette 1. The roller 5 is freely rotatable and is prestressed in the direction onto the one film surface by a spring, whereas the roller 4 presses against the film surface at the opposite side. The roller 4 is connected to a reversible drive means that comprises a gearwheel 6 that is in engagement with the roller 4 and transmits the rotational energy onto the roller 4. The gearwheel 6 is driven by a motor 8 via a conveyor belt 7, whereby the rotational sense of the motor 8 is reversible.

A transmission 9, a gearwheel 10 and a rewind motor 11 are present for rewinding the film web 3.

The recording apparatus (not shown in greater detail) comprises a stationary exposure trough 12 functioning as a stationary holder shaped like a cylindrical segment for holding the film web 3 during the exposure.

A conveying channel 13 that is formed by the inside surface of the exposure trough 12 on the one hand and by guide parts 14 shaped like circular segments on the other hand is present for guiding the film web 3 during conveying. As a means for clamping the film material of the exposure trough 12 comprises suction channels (not visible in the figure) that proceed parallel to one another and in the conveying direction of the film web 3 for the vacuum-fixing of the film web 3 against the inside surface of the exposure trough 12. The suction channels are connected to one another via a suction line 15 and are connected to a vacuum pump 17 via a controllable vacuum valve 16.

A recording carriage 18 (not shown in detail) is provided for the exposure of the film web 3, this recording carriage 18 being displaceable in the direction of the longitudinal axis of the exposure trough 12 with guides **18*a*, 18*b* and with a spindle 18*c*. The recording carriage 18 carries a recording element 18*d* having a light source modulated by an image signal for generating a recording beam that is radially deflected onto the exposure trough 12 by a rotating mirror or by a rotating prism and exposes the film web 3 point-by-point and line-by-line. The guide parts 14 are secured to the recording carriage 18 and are spaced in the direction of the longitudinal axis of the exposure trough 13** such that they form a light well for the recording beam.

A positioning unit 19 for the film web 3 is arranged at the outlet opening of the conveying channel 13 lying opposite the supply cassette 1, this positioning unit comprising a spring-loaded, first roller 20 acting on the one film surface as well as a second roller 21 that attacks at the opposite film surface and interacts with the first roller 20. The second roller 21 is connected via a belt 22 to a motor 23 whose rotational sense can be reversed.

The rollers 20, 21 of the positioning unit 19 are coated with cotton as a glide coat in order to allow them to slide on the film surface.

Hold-down units 24, 30 for the film web 3 are arranged at both ends of the conveying channel 13, these hold-down units 24, 30 being provided with a soft material, for example with velvet for gentle treatment of the film material. The hold-down units 24 is rigidly coupled to a pivotable lever 25 that is pivotable around an axis 26 and can be drawn into a hold-down position by a spring 27 wherein the hold-down units 24 presses the film web 3 against the inside surface of the exposure trough 12.

For automatic actuation of the hold-down units 24, the lever 25 is connected to the actuation plunger 28 of an electromagnet 29 that moves the hold-down units 24 into a release position when excited.

The hold-down units 30 is drawn into a hold-down position in the same way via a lever 31 rigidly connected thereto that is pivotable around an axis 32 and on the basis of a spring 32 given lack of excitation of an electromagnet 34. Upon excitation of the electromagnet 34, the lever 31 is likewise moved into a release position via an actuation plunger 35 of the electromagnet 34.

The hold-down units 24, 30 that are provided at the entry and outlet of the exposure trough 12 have the job of pressing the film web 3 against the inside wall of the exposure trough 12 at the entry and outlet of the conveying channel 13, so that the vacuum can suction the film web 3 against the inside surface of the exposure trough 12 over the full surface of the film web 3.

A cutting device 36 having a cutter blade 37 is present following the positioning unit 19 in the conveying direction of the film web 3, a film sheet having a specific format, also referred to as a film slip, being capable of being cut off from the film web 3 with this cutter device as needed. At that side facing away from the positioning unit 19, the cutter device 36 is followed by a rotary pulse generator 38 that serves as a measuring instrument for measuring the length of the conveyed film web 3. The cutter device 36 and the rotary pulse generator 38 are combined to form a single unit. The cutter blade 37 is designed as a rolling blade driven by a toothed belt that is driven in cutting fashion in both directions by a motor.

The rotary pulse generator 38 serving the purpose of measuring the film length registers the motion of the film web 3 via a metering wheel 39 that is designed as a friction wheel.

A broadened conveying section 40 follows the rotary pulse generator 38 in the conveying direction of the film web 3. The broadened conveying section 40 comprises a cover plate **40*a* and a bottom plate 40*b*. A sensor 41 that is designed as a lever and is pressed against the traversing film web 3 projects into the broadened conveying section 40. The cover plate 40*a* is designed as a wire basket, whereas the bottom plate 40*b*** serves as a guide plate.

The broadened conveying section 40 is followed by an edge control means 42. A first roller 43 is driven in the conveying direction of the film web 3 via a belt 44 and a motor 45. A second roller 46, whose axis is held in a rotatable axial bracket 47, attacks at that side of the film web 3 lying opposite the first roller 43. As a result thereof, the second roller 46 can be set obliquely relative to the conveying direction of the film web 3. The oblique positioning of the second roller 46 is controlled by a motor 49 upon interposition of a gearing 48. A sensor 50 is present for acquiring the respective edge position of the conveyed film web 3.

The film web 3 that is controlled in view of its edge position then passes through an outlet slot 51 in which a light seal 52 is arranged for shielding against light incidence into the interior of the apparatus. The light seal 52 is pivoted into the opened position by the film web 3 conveyed therethrough and closes automatically when there is no film web 3. A take-up cassette 53 in which the exposed film web 3, or, the cut-off film slips, are wound up, is arranged at the outlet slot 51. The drive of the take-up cassette 53 occurs via a motor 54 arranged at the recording apparatus and via a gearing 55 via which the rotational energy is coupled onto a reel holder rigidly connected to the hub of the take-up cassette 53.

The operation of the device shall be set forth in greater detail below.

Before the clamping procedure, the supply cassette 1 is situated in the mount 2 of the recording apparatus, and the take-up cassette 53 or a conveying channel to a connected developing station, is located at the outlet slot 51. Further, the recording carriage 18 is moved from an idle position in the direction of the longitudinal axis of the exposure trough 12 into a clamping position wherein the guide parts 14 are positioned roughly in the middle of the film web 3 to be clamped. Further, the hold-down units 24 is lowered onto the inside surface of the exposure trough 12 and the hold-down units 30 is lifted up.

The clamping procedure now begins in that the motor 8 is started and the film material 3 is conveyed out of the supply cassette 1 with the assistance of the rollers 4, 5 driven by the motor 8 and is conveyed through the conveying channel 13, the positioning unit 19, and the cutting device 36, until a start of the film web 3 is recognized by the rotary pulse generator 38, at which time the motor 8 is shut off. The motor 23 was also started simultaneously with the motor 8, namely with a conveying speed that is lower in comparison to the conveying speed prescribed by the pair of rollers 4, 5. The rollers 20, 21 of the positioning unit 19 are thereby slightly lifted off from the film web 3, but only to such an extent that there is still contact between the film web 3 and the rollers 20, 21. Since the rollers 20, 21 are covered with cotton and therefore slide easily, the film web 3 conveyed through between the rollers 20, 21 is slightly decelerated and is consequently always placed against the inside surface of the exposure trough 12 with slight pressure, so that the film web is already optimally guided into the rated position during clamping. During the conveying of the film web 3, compressed air is advantageously blown into the suction channels of the exposure trough 12 on the basis of a suitable setting of the vacuum valve 16 in order to allow the film material to glide on a slight air cushion during conveying. The air cushion advantageously prevents film material from adhering to the inside of the exposure trough 12 due to electrostatic charging.

When the start of the film web 3 has reached the rotary pulse generator 38, the motor 7 is stopped and the motor 23 of the positioning unit 19 is reversed. The rollers 20, 21 now run opposite the previous conveying direction of the film web 3, and planarly press the film web 3 against the inside surface of the exposure trough 12. The pressing power of the rollers 20, 21 is thereby set only to such a force that they can in fact convey the film web 3, but the film web can still be laterally displaced between the rollers, a tension-free and, thus, fold-free clamping being thus assured.

The motor 23 and, thus, the smoothing motion of the rollers 20, 21, is stopped after an adjustable time interval. Simultaneously, the hold-down means 30 previously remaining in the release position is lowered into the hold-down position and the vacuum valve 16 is switched to vacuum suctioning, as a result whereof the film web 3 is fixed in the exposure trough 12. The recording carriage 18 then travels out of its clamping position to the middle of the film web 3 in the axial direction into its start of exposure position at the edge of the film web 3 and the exposure begins, whereby the respective line beginning lies in the region of the hold-down units 30 and the respective line end lies in the region of the hold-down units 24.

It has been previously mentioned that the start of the film web 3 is conveyed up to the rotary pulse generator 38. This is only the case when the start of a new film web 3 in a newly loaded supply cassette 1 is involved. What is assured in this way is that the film material lying between the start of the film web 3 and the line start is not used for the exposure due to potential prior exposures. In the following, endless exposures, i.e. given successive exposures without a cutting event, the film web 3 is respectively conveyed only to such an extent that the new line beginning lies in the region of the hold-down means 30.

The release of the film web 3 from the exposure trough 12 begins after the exposure. For this purpose, the hold-down units 24, 30 are lifted off from the film web 3 by the electromagnets 29, 34 and the vacuum is disconnected. Simultaneously, the motor 8 for the supply cassette 1, the motor 23 of the positioning unit 19, the motor 45 of the edge control units 42 and the motor 54 of the take-up cassette 53 are switched on.

The film web 3 now runs through the cutting device 36 into the conveying section 40, whereby the rotary pulse generator 38 at the cutting device 36 measures the path traversed by the film web 3 via the metering wheel 39. In the conveying section 40, the film web 3 travels in an arc along the cover plate 40*a* of the broadened conveying section 40 into the edge control units 42, as a result whereof a film loop forms in the broadened conveying section 40. The rollers 43, 46, which serve as edge control rollers, are driven with higher circumferential speed than the film webs supplied by the motor 8 and the pair of rollers 4, 5. As a consequence of the faster rollers 43, 46, the film loop becomes smaller and smaller in the broadened conveying section 40. The sensor 41 is designed as a switch and is resiliently pressed against the film loop from below, i.e. against the underside of the film. It switches the motor 45 (i.e. the edge control rollers 43) and the motor 54 (i.e. the take-up cassette or conveying channel drive) off after a defined, minimum length of the film loop. Since the motor 8, however, continues to run and the film web 3 thus continues to be supplied via the rollers 4, 5, the film loop in the broadened conveying section 40 again enlarges, so that the sensor 41 is again moved into the opening direction and again switches the motors 45, 54 on. The maximum, or, respectively, minimum, loop size is thus defined by the switching hysteresis of the sensor 41.

The film loop formed in the broadened conveyor section 40 compensates the different speeds between supply cassette 1 and take-up cassette 53 and also enables the following film edge control.

The start of the film web 3 is conducted through the appropriately shaped cover plate 40*a* and the floor plate 40*b* into the rollers 43, 46 of the edge control units 42. The film edge position is thereby interrogated by the sensor 50, which is designed as a switch and is laterally arranged, by sensing the right-hand edge of the film web 3 as seen in the running direction. The rollers 43, 46 hold the film web 3 in the lateral direction in a position defined by the sensor 50.

The lower roller 46 of the pair of rollers 43, 46 is a small, rotatable rubber roller whose axial position can be turned by the motor 49 designed as a DC motor. The motor 49 is driven in accordance with the result of the interrogation of the sensor 50, and thus the lower roller 46 is turned to such an extent in its axial position that the sensed film edge is always situated in the proximity of the switch point of the sensor 50.

What the additional control of the lateral edge position enables is that the film is conveyed through the apparatus in a predetermined position and/or is output from the film output gap in a predetermined position. For example, the lateral position in which the output film is wound up in a take-up cassette can thus be prescribed in defined fashion.

Following the edge control units 42, the film web 3 controlled in terms of its lateral position runs over the outlet slot 51 into the take-up cassette 53. The film web 3 is automatically captured and wound up in the take-up cassette 53. The wind-up speed of the take-up cassette 53 is higher than the conveying speed of the rollers 43, 46 of the edge control units 42. The motor 54 of the take-up cassette 53, however, is set so weak that the film tension onto the rollers 43, 46 is slight, so that the motor acts as an electrical spring.

When the rotary pulse generator 38 has reached the desired counting mark, i.e. when the desired conveying length of the film web 3 has been measured, the motor 8 of the supply cassette and the motor 23 of the positioning unit 19 are shut off. The rollers 43, 46 of the edge control units 42, however, initially continue to run and decrease the size of the loop in the broadened conveying section 40 until a sensor responds and shuts off the motor 45 for the rollers 43, 46 and the motor 54 for the take-up cassette 53. A new exposure can now be started.

When, however, an immediately following exposure is not desired, but a film cutting process is to be implemented, the film web 3 is moved a distance farther into the cutting device 36 by inputting the cut instruction and is cut therein. After the cutting, the motors 45, 54 for the rollers 43, 46 and for the take-up cassette 53 are turned on. The exposed, cut-off film slip thus runs into the take-up cassette 53 until the sensor 50 switches when the end of the film slip travels past and all motors are stopped.

When a new exposure is desired, the start of the film web 3 is conveyed by the positioning unit 19 from the position under the cutter blade 37 back into the position in the region of the hold-down units 30.

The take-up cassette 53 with the exposed film material can now be removed from the recording apparatus or the exposed film material is conveyed away to the developing station via a conveying channel.

Upon removal of the take-up cassette 53, this closes light-tight, whereby the film end projecting a few centimeters therefrom is fixed. As a result of the light seal 52, the recording apparatus is also light-tight without an introduced take-up cassette 53, so that exposure can continue to be carried out.

The device of the invention also enables the automatic acquisition of the film supply still present in the supply cassette 1. For this purpose, the rotational speed of a film reel hub carrying the film web 3 in the supply cassette 1 is registered and is compared to the conveying speed of the film web 3. How much remaining film is still in the supply cassette 1, first, and, second, whether the supply cassette 1 is empty when the pulses from the hub are not registered, i.e. the hub is no longer being turned, can be calculated from the two speeds. Dependent on the time when an identification is made that the film end has been reached, the last film slip can still be clamped and exposed, or, if the film format is no longer adequate, the unloading of the film can be implemented in the described way. The acquisition of the quantity of the film supply and of the film end shall be set forth in greater detail below.

When a change in film width is desired, i.e. the supply cassette 1 is to be changed, the film web 3 must be previously cut, the exposed film material must be introduced into the take-up cassette 53, and the unexposed film material must be moved from the exposure trough 13 back into the supply cassette 1. The supply cassette can then be replaced. A mechanical modification at the recording apparatus is not necessary given a change in film width. The machine control receives the information about the film width employed either via the user service from the user or via a coding at the supply cassette 1. In the latter instance, the supply cassette 1 has a magnet holder for cassette recognition at the film outlet side into which three magnets can be engaged. Sensors in the mount 2, which are not shown but are preferably arranged between the gearwheel 10 and the roller 26, register the magnets and report the presence of a specific cassette to the recording apparatus.

Although various minor changes and modifications might be proposed by those skilled in the art, it will be understood that we wish to include within the claims of the patent warranted hereon all such changes and modifications as reasonably come within our contribution to the art.

We claim:

1. A device for clamping and releasing film material onto and from a stationary holder, comprising:

said stationary holder comprising an exposure trough having a curved shape, said exposure trough having an inside surface at which vacuum grooves are provided connected to a vacuum means for producing an air cushion for supporting the film material during conveyance through the trough and for producing a vacuum for clamping the film material when the film material is no longer being conveyed;

a conveying channel being formed along said inside surface of said exposure trough, said conveying channel having a film entry and a film outlet;

a supply cassette containing the film material arranged at said film entry of said conveying channel, said supply cassette having a film outlet gap;

a take-up cassette for storing exposed film material, said take-up cassette being positioned after said film outlet of said conveying channel;

conveying roller means arranged inside said supply cassette adjacent said film outlet gap for delivering the film material to the film entry of the conveying channel and for conveying the film through the conveying channel;

positioning means for positioning the film material against the inside surface of the exposure trough prior to application of said vacuum, said positioning means including outlet roller means at the film outlet and driving means for driving the film outlet roller means in a forward direction to receive a leading nip of the film material as said film material is conveyed through the conveying channel by the roller means in the supply cassette and for reversing rotation when the roller means in the supply cassette stop so as to cause a pressing of the film material against said inside surface, at which time said vacuum means produces said vacuum for clamping the film material.

2. A device according to claim 1 wherein a first pivotable controllable hold-down unit is provided for fixing the film material at said film entry and a second pivotable and controllable hold-down unit arranged at said film outlet of said conveying channel for fixing the film material at said film outlet.

3. A device according to claim 1 wherein the roller means in the supply cassette are covered with a glide coating;

said positioning means drives said roller means at said film outlet with a lower speed than a speed of the roller means in the supply cassette when the film material is being conveyed through the conveying channel.

4. A device according to claim 1 wherein a measuring means is provided for measuring a length of conveyed film material.

5. A device according to claim 4 wherein said measuring means is arranged adjacent said positioning means.

6. A device according to claim 1 wherein said conveying roller means and said outlet roller means each have a pair of rollers, and wherein means is provided for pressing the pair of rollers of said conveying roller means against one another in spring-loaded fashion.

7. A device according to claim 1 wherein between said take-up cassette and said film outlet of said conveying channel a film conveying section is provided which is shaped for permitting a loop of the film material having a radius to change during operation of the device.

8. A method for clamping and releasing film material onto and from a stationary holder, comprising the steps of:

providing an exposure trough having a conveying channel with a film entry and a film outlet, said exposure trough having an inside surface against which the film material is clamped while being exposed, providing a supply cassette having an internal supply roller unit and a film outlet gap and containing the film material to be clamped, said supply roller unit provided next to said film outlet gap of the cassette, and said supply cassette being positioned at said film entry;

providing a take-up cassette for storing the exposed film material after the film outlet of said conveying channel;

providing a controllable vacuum source for producing either an air cushion or a vacuum in said conveying channel;

providing a positioning roller unit at said outlet on said conveying channel;

energizing the supply roller unit to convey film material into and through the conveying channel and said controllable vacuum source providing an air cushion between the inside surface of the exposure trough and the film material;

energizing said outlet roller unit in a forward direction as said supply roller unit is conveying film material for grabbing a leading end of the film material as said film material leaves the film outlet of the conveying channel;

stopping conveying of the film material by stopping the film cassette conveying roller unit and reversing a rotation direction of the roller unit at the film outlet so as to press the film material against the inside surface of the exposure trough;

stopping the outlet roller unit and providing a vacuum with said vacuum source to clamp the film material against the inside surface of the exposure trough;

exposing the film material;

switching off the vacuum; and conveying the exposed film material to the take-up cassette with the film outlet roller unit.

9. A method according to claim 8 including the steps of providing a first controllable hold-down unit which is pressed against the film material at the film entry of the conveying channel after the outlet roller unit has stopped its reverse rotation and also providing a second controllable hold-down unit which presses against the film material at the film outlet when the outlet roller has stopped its reverse rotation.

10. A method according to claim 8 including the step of providing an edge control means for aligning an edge of the film material transversely relative to a conveying direction during conveying of the film material.

* * * * *